United States Patent
Azuma et al.

(10) Patent No.: US 9,817,179 B2
(45) Date of Patent: Nov. 14, 2017

(54) LIGHT SOURCE UNIT, DISPLAY APPARATUS AND LIGHTING APPARATUS

(71) Applicant: Sakai Display Products Corporation, Sakai-shi, Osaka (JP)

(72) Inventors: Hiroki Azuma, Sakai (JP); Harumasa Tomizuka, Sakai (JP); Yusuke Miyake, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/425,970

(22) PCT Filed: Jun. 10, 2014

(86) PCT No.: PCT/JP2014/065354
§ 371 (c)(1),
(2) Date: Mar. 4, 2015

(87) PCT Pub. No.: WO2014/199987
PCT Pub. Date: Dec. 18, 2014

(65) Prior Publication Data
US 2015/0234116 A1   Aug. 20, 2015

(30) Foreign Application Priority Data

Jun. 14, 2013   (JP) ................................. 2013-125695

(51) Int. Cl.
*F21V 7/00*   (2006.01)
*F21V 8/00*   (2006.01)
*F21V 9/00*   (2015.01)

(52) U.S. Cl.
CPC .......... *G02B 6/0088* (2013.01); *F21V 7/0066* (2013.01); *F21V 9/00* (2013.01); *G02B 6/0051* (2013.01); *G02B 6/0055* (2013.01)

(58) Field of Classification Search
CPC .. G02B 6/0051; G02B 6/0055; G02B 6/0088; F21V 9/00; F21V 7/0066;
(Continued)

(56) References Cited

U.S. PATENT DOCUMENTS 6,950,154 B2 *   9/2005   Lee ...................... G02B 6/0088
                                                                349/58
7,324,174 B2 *   1/2008   Hafuka ............. G02F 1/133608
                                                                349/58
(Continued)

FOREIGN PATENT DOCUMENTS

JP   2000-214786 A   8/2000
JP   2003-207767 A   7/2003
(Continued)

*Primary Examiner* — Anh Mai
*Assistant Examiner* — Arman B Fallahkhair
(74) *Attorney, Agent, or Firm* — Rudy J. Ng; Bret E. Field; Bozicevic, Field & Francis LLP

(57) ABSTRACT

An example light source unit, comprising: a light emitting plate that emits light toward a front; an optical sheet that is separated from and faces a front surface of the light emitting plate; a support part that supports an edge portion of the optical sheet; and a holding section that faces an edge portion of a front or a back side of the optical sheet and holds the optical sheet.

14 Claims, 9 Drawing Sheets

(58) Field of Classification Search
CPC ......... G02F 1/133608; G02F 1/133308; G02F 1/133603; G02F 2001/133314; G02F 2001/133317
USPC ........ 362/632–634, 97.1–97.4, 23.15–23.19, 362/217.11; 349/58, 60, 65, 56
See application file for complete search history.

(56) References Cited

U.S. PATENT DOCUMENTS

| | | | | |
|---|---|---|---|---|
| 7,413,338 | B2* | 8/2008 | Pan | G02B 6/0088 362/632 |
| 7,426,106 | B2* | 9/2008 | Nakagawa | G02F 1/133308 349/58 |
| 7,499,130 | B2* | 3/2009 | Tsai | G02F 1/133512 349/110 |
| 7,573,540 | B2* | 8/2009 | Katsuda | G02F 1/133308 349/58 |
| 7,973,873 | B2* | 7/2011 | Ha | G02F 1/133606 349/110 |
| 8,342,704 | B2* | 1/2013 | Yamamoto | G02F 1/133608 362/223 |
| 8,451,399 | B2* | 5/2013 | Ishinagawa | G02F 1/133615 349/62 |
| 9,077,791 | B2* | 7/2015 | Jeong | G06F 1/1637 362/97.1 |
| 9,298,026 | B2* | 3/2016 | Park | G02F 1/133308 |
| 2010/0073959 | A1 | 3/2010 | Hamada | |
| 2010/0328557 | A1 | 12/2010 | Yamamoto | |

FOREIGN PATENT DOCUMENTS

| | | |
|---|---|---|
| JP | 2008-299181 A | 12/2008 |
| JP | 2009-211933 A | 9/2009 |
| JP | 2012-058611 A | 3/2012 |
| WO | WO2008090646 A1 | 7/2008 |
| WO | WO2009107433 A1 | 9/2009 |

* cited by examiner

F I G. 2
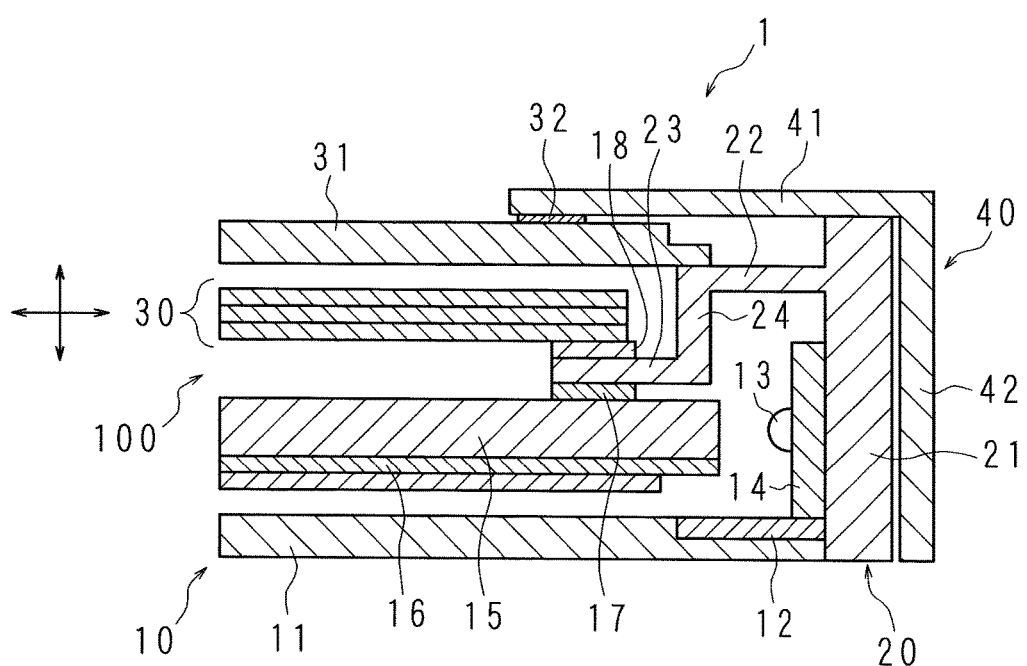

LIGHT SOURCE UNIT, DISPLAY APPARATUS AND LIGHTING APPARATUS

CROSS-REFERENCE TO RELATED APPLICATIONS

This application is the national phase under 35 U.S.C. §371 of PCT International Application No. PCT/JP2014/065354 which has International filing date of Jun. 10, 2014 and designated the United States of America.

FIELD

The technology herein relates to a light source unit, a display apparatus and a lighting apparatus which include the light source unit.

BACKGROUND AND SUMMARY

Generally, thin type display apparatuses having a small occupation area relative to a size of a display screen have been widely distributed. Many of the thin type display apparatuses display an image on a display panel by light from a backlight unit (a light source unit).

There are two types of light source unit, an edge light type which includes a light guide plate facing the display panel and a light source facing a peripheral surface of the light guide plate, and a direct type in which a light source unit such as a light emitting diode (LED) or a cold-cathode fluorescent tube is disposed opposite to the display panel.

In the edge light type, an optical sheet might be directly placed on a front of the light guide plate so as to perform diffusion, polarization of light or the like. In the direct type, the optical sheet might be separated from and disposed opposite to the front of the light source so as to perform diffusion, polarization of light or the like.

As the display apparatus of the edge light type, when the optical sheet is directly placed on the front of the light guide plate, the optical sheet may be wrinkled by heat from the light source, and the quality of the image displayed on the display panel may be decreased.

Therefore, as the display apparatus of the direct type, an edge light type in which a support part for supporting the optical sheet is provided, and an optical sheet that is separated from the light guide plate by the support part could be proposed.

However, when the optical sheet is separated from the light guide plate, the optical sheet moves in a longitudinal direction and a lateral direction during assembly or transportation of the display apparatus, whereby there are problems that the light guide plate may be damaged, and white lines or dots may be visually recognized on the display screen, thus causing a decrease in display quality.

In consideration of the above-described circumstances, it is an object to provide an example embodiment of a light source unit in which a movement of an optical sheet and a decrease of display quality may be prevented even when the optical sheet and a planar light emitting part having a light guide plate, etc., are disposed apart from each other, as well as a display apparatus and a lighting apparatus.

According to one aspect of the example embodiment, there is provided a light source unit, comprising: a light emitting plate that emits light toward a front; an optical sheet that is separated from and faces a front surface of the light emitting plate; a support part that supports an edge portion of the optical sheet; and a holding section that faces an edge portion of a front or a back side of the optical sheet and holds the optical sheet.

In the light source unit according to the example embodiment the support part may face the edge portion of the back side of the optical sheet, and the holding section may be provided between the support part and the edge portion of the back side of the optical sheet.

In the light source unit according to the example embodiment, the holding section may include an adhesive member.

In the light source unit according to the example embodiment, the holding section may include a convex and a concave that are formed on a place of the support part facing the edge portion of the optical sheet.

In the light source unit according to the example embodiment, the optical sheet may be formed in a rectangular shape, one edge part of the optical sheet is to be located at an upper side, and the holding section may be provided on a side of the other edge part of the optical sheet opposite to the one edge part of the optical sheet.

In the light source unit according to the example embodiment, the optical sheet may be formed in a laterally long rectangular shape, and the holding section may be provided on the long edge part of the optical sheet.

According to another aspect of the example embodiment, there is provided a display apparatus comprising: the light source unit according to any one of the above; and a display panel that is disposed on a front side of the light source unit, and displays an image.

In the display apparatus according to the example embodiment, the holding section may be provided between the display panel and an edge portion of the front side of the optical sheet.

According to another aspect of the example embodiment, there is provided a lighting apparatus including: the light source unit according to any one of the above; and a transmissive panel that is disposed on a front side of the optical sheet.

In the lighting apparatus according to the example embodiment, the holding section may be provided between the transmissive panel and an edge portion of the front side of the optical sheet.

In the example embodiment, by providing the holding section on the edge portion of the front or the back side of the optical sheet, for example, the edge portion of the back side of the optical sheet is supported by the support part, or the edge portion of the front side of the optical sheet is supported on the display panel or the transmissive panel which are disposed on the front side of the optical sheet, such that the movement of the optical sheet may be prevented.

In the example embodiment, the holding of the optical sheet may be achieved by using the adhesive member as the holding section, for example, an elastomer member having adhesive or a double-sided tape.

In the example embodiment, the holding of the optical sheet may be achieved by forming a convex and a concave on the support part, and engaging the optical sheet with the convex and concave.

In the example embodiment, one edge part (upper edge part) side of the optical sheet is supported on a back support part, and the other edge part (lower edge part) facing the one edge part is supported by the holding section. When the one edge part side is vertically disposed upward (when the optical sheet is hung), the other edge part side which becomes a free end is held by the holding section, such that the movement of the optical sheet may be effectively prevented.

In the example embodiment, when the optical sheet is disposed without hanging the optical sheet, a long edge part of the optical sheet formed in a laterally long rectangular shape is supported by the holding section. Thereby, even when the optical sheet is expanded or contracted by heat in a longitudinal direction, an occurrence of the wrinkles in the optical sheet may be suppressed.

In the light source unit, the display apparatus and the lighting apparatus according to the example embodiment, by providing the holding section on the edge portion of the front or the back side of the optical sheet, for example, the edge portion of the back side of the optical sheet is supported by the support part, or the edge portion of the front side of the optical sheet is supported on the display or the transmissive panel which are disposed on the front side of the optical sheet, such that the movement of the optical sheet may be prevented.

BRIEF DESCRIPTION OF THE DRAWINGS

FIG. 2 is a partial cross-sectional view of the display apparatus.

DETAILED DESCRIPTION OF NON-LIMITING EXAMPLE EMBODIMENTS (Embodiment 1)

Figure 1:
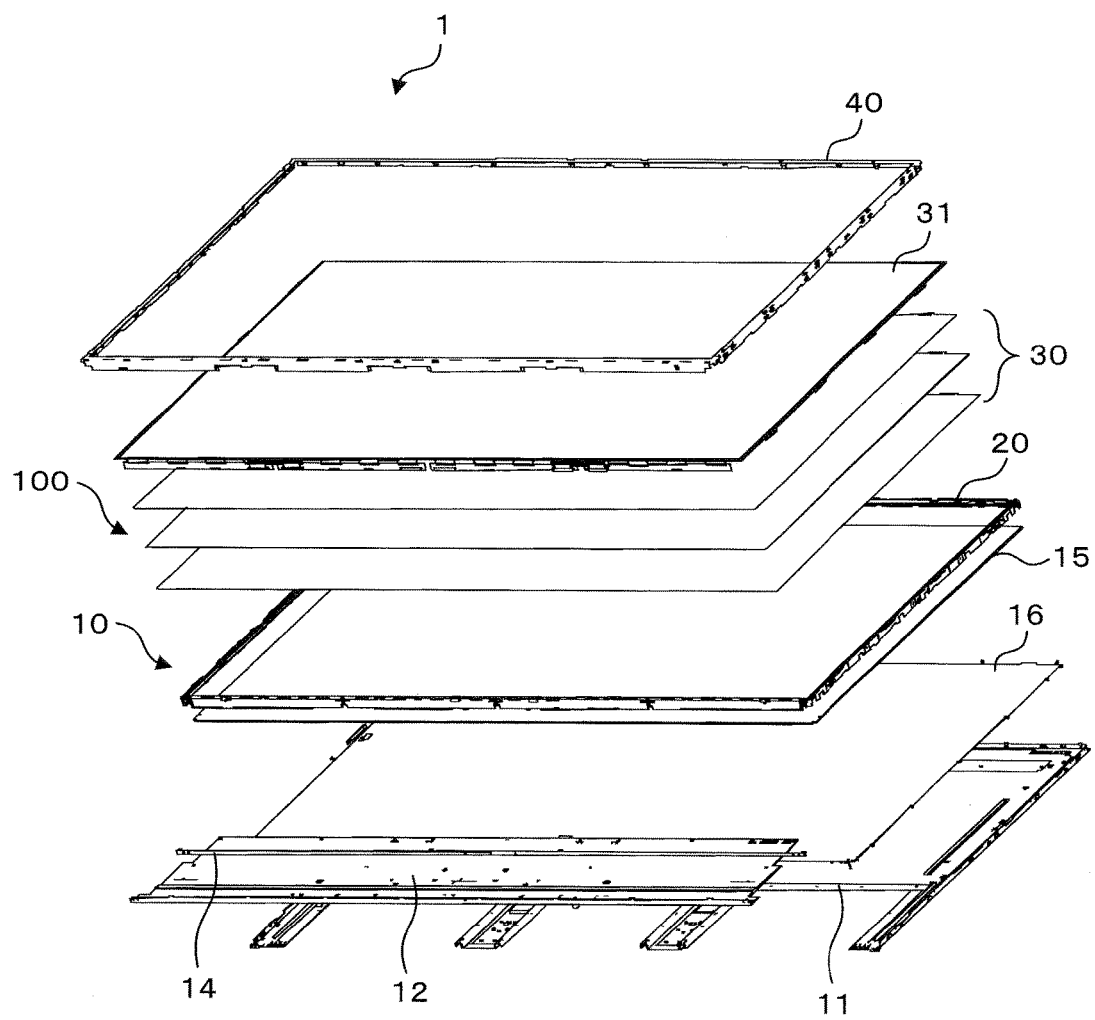
FIG. 1 is an exploded perspective view schematically illustrating an example of non-limiting display apparatus according to Embodiment 1.

Hereinafter, the example embodiment will be described with reference to the drawings illustrating an example of non-limiting display apparatus 1 according to Embodiment 1. FIG. 1 is an exploded perspective view schematically illustrating the display apparatus 1, and FIG. 2 is a partial cross-sectional view of the example of non-limiting display apparatus 1.

The display apparatus 1 includes a laterally long rectangular display panel 31 having a liquid crystal, a light source unit 100 which is disposed on a back side of the display panel 31 and emits light toward the display panel 31, and a bezel 40 which covers a front edge portion of the display panel 31 to fix the display panel 31.

The light source unit 100 includes a planar light emitting part 10 which emits light to the front side, a laterally long rectangular optical sheet 30 disposed on the front side of the planar light emitting part 10, and a laterally long rectangular panel chassis 20 which supports the optical sheet 30 and the display panel 31. The planar light emitting part 10 includes a light emitting diode 13, a substrate 14, a light guide plate 15 (light emission plate), and a reflection sheet 16, which will be described below.

The planar light emitting part 10 is located on the front side of a backlight chassis 11 formed in a laterally long rectangular shape. The reflection sheet 16, which is formed in a laterally long rectangular shape and reflects light, is provided on the front of the backlight chassis 11. The laterally long rectangular light guide plate 15 is located in front of the reflection sheet 16. The reflection sheet 16 covers an entire back surface of the light guide plate 15.

A heat dissipation plate 12 is fixed to a front edge portion of the backlight chassis 11. The substrate 14 protrudes from the heat dissipation plate 12 to the front side. One surface of the substrate 14 is disposed opposite to a peripheral surface of the light guide plate 15, and the light emitting diode 13 is mounted on the one surface of the substrate 14. The light emitting diode 13 is disposed opposite to the peripheral surface of the light guide plate 15. Light emitted from the light emitting diode 13 is entered into the light guide plate 15 from the peripheral surface of the light guide plate 15, irregularly reflected inside of the light guide plate 15, and emitted from the front surface of the light guide plate 15. Further, the light advancing to the back side of the light guide plate 15 is reflected by the reflection sheet 16 such that a traveling direction thereof is changed to the front side, and emitted from the front surface of the light guide plate 15. The light emitting diode 13 is attached to the heat dissipation plate 12 through the substrate 14, and heat from the light emitting diode 13 is released to an outside through the heat dissipation plate 12 and the backlight chassis 11.

A rectangular frame-shaped panel chassis 20 is provided around the backlight chassis 11 (in other words, around the planar light emitting part 10). The panel chassis 20 comprises a side wall plate 21 which is disposed on an edge portion of the backlight chassis 11 and an outside of the other surface of the substrate 14. The side wall plate 21 extends along each of four sides of the backlight chassis 11, and is parallel to a direction orthogonal to the backlight chassis 11. A panel support plate 22 substantially parallel to the backlight chassis 11 protrudes from a front side portion of the side wall plate 21 toward the inside of the display apparatus 1. The display panel 31 is supported on the front surface of the panel support plate 22.

The panel chassis 20 includes a sheet support plate 23 which is connected to a protruding end portion of the panel support plate 22 through a connecting part 24, and supports the optical sheet 30 substantially parallel to the panel support plate 22. The sheet support plate 23 is disposed opposite to a front edge portion of the light guide plate 15 and extends along the front edge portion. An end portion of the sheet support plate 23 on the side wall plate 21 side is connected to the protruding end portion of the panel support plate 22 through the connecting part 24. As illustrated in FIG. 2, the panel support plate 22, the connecting part 24 and the sheet support plate 23 are formed in a crank shape in a plan view.

An elastic member 17 is provided between the back surface of the sheet support plate 23 and the light guide plate 15 as a spacer. An adhesive member 18 is provided on the front surface of the sheet support plate 23. The back surface of the adhesive member 18 is adhered to the front surface of the sheet support plate 23. A plurality of optical sheets 30 for diffusing and collecting light emitted from the light guide plate 15 are provided on the front surface of the adhesive member 18, and a back edge portion of the optical sheet 30 is adhered to the adhesive member 18. The optical sheets 30 are held to the sheet support plate 23 through the adhesive member 18. As the adhesive member 18, there may be, for example, an ethylene thermoplastic elastomer member, a styrene thermoplastic elastomer member, a double-sided tape or the like.

Due to the presence of the elastic member 17, the sheet support plate 23 and the adhesive member 18, a gap is present between the light guide plate 15 and the optical sheet 30 excluding an edge portion thereof, such that the light guide plate 15 and the optical sheet 30 are separated from each other in a front-back direction. Therefore, when the adhesive member 18 is not provided, for example, when a non-adhesive spacer is provided on the front surface of the sheet support plate 23 instead of the adhesive member 18, as illustrated by an arrow in FIG. 2, the optical sheets 30 move in the front-back direction and a lateral direction during transportation of the display apparatus 1 or assembly of the display apparatus 1. However, in the present embodiment, the movement of the optical sheets 30 may be prevented by the adhesive member 18. Further, the adhesive member 18 may be a member having an adhesive to the extent that it is not peeled off from the optical sheet 30 and the sheet support plate 23 during transportation of the display apparatus 1 or assembly of the display apparatus 1, and it is not limited to the above-exemplified members.

The display panel 31 is provided on the panel support plate 22 of the panel chassis 20. Specifically, the back edge portion of the display panel 31 is supported on the front surface of the panel support plate 22. A thickness of the connecting part 24 and the panel support plate 22 in the front-back direction thereof is larger than the thickness of the adhesive member 18 and the optical sheets 30 in the front-back direction thereof. That is, a gap is present between the display panel 31 and the optical sheet 30, such that the display panel 31 and the optical sheets 30 are separated from each other in the front-back direction.

As illustrated in FIG. 2, the rectangular frame-shaped bezel 40 is provided on the front edge portion of the display panel 31 and around the panel chassis 20. The bezel 40 has an L-shaped cross-section, and includes a front portion 41 which covers the front side of the display panel 31 and the panel chassis 20, and a side portion 42 which protrudes from an outer edge part of the front portion 41 to the back direction, and covers an outer surface of the side wall plate 21 of the panel chassis 20. An elastic member 32 is provided between the front portion 41 and the display panel 31 as a spacer. The side portion 42 has an engaging part (not illustrated), and the backlight chassis 11 has an engaged part (not illustrated) which is engaged with the engaging part. When the engaging part is engaged with the engaged part, the display panel 31 is fixed by the bezel 40.

Next, an attaching position of the adhesive member 18 will be described. FIGS. 3A to 3B, and FIGS. 4A and 4B are views describing the attaching positions of the adhesive member 18. Herein, top, bottom, left and right directions illustrated together with arrows in FIGS. 3 and 4 denote the top, bottom, left and right directions when seen from the front of the display apparatus 1 while being vertically disposed. When the display apparatus 1 is vertically disposed, an edge part (herein after referred to as an upper edge part) of the optical sheet 30 located on an upper side may be supported by the backlight chassis 11 or the panel chassis 20. In this case, when the display apparatus 1 is vertically disposed, the optical sheets 30 become in a state of being hung, and lower portions thereof become a free end.

Figure 3A:
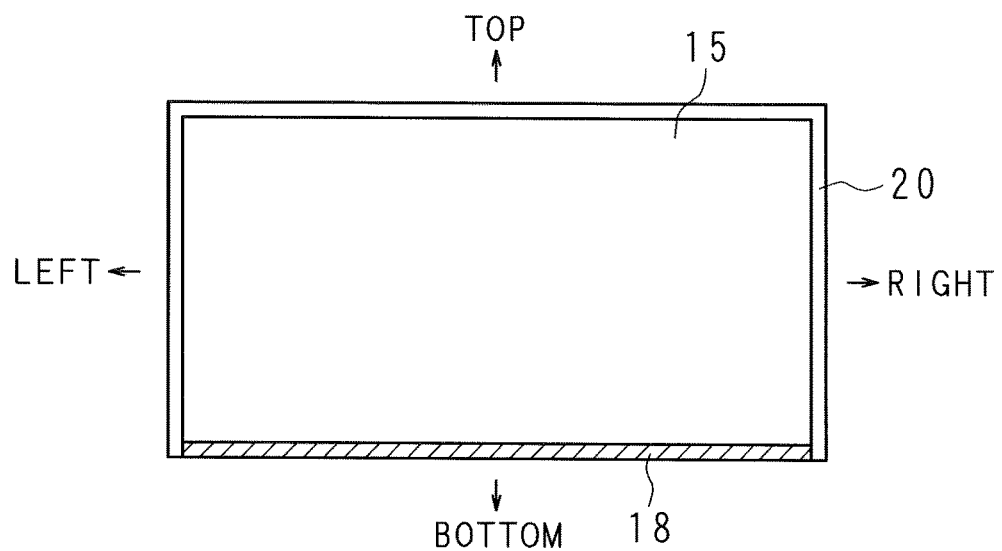
FIG. 3A is a view describing an example of non-limiting attaching position of an adhesive member.
Figure 3B:
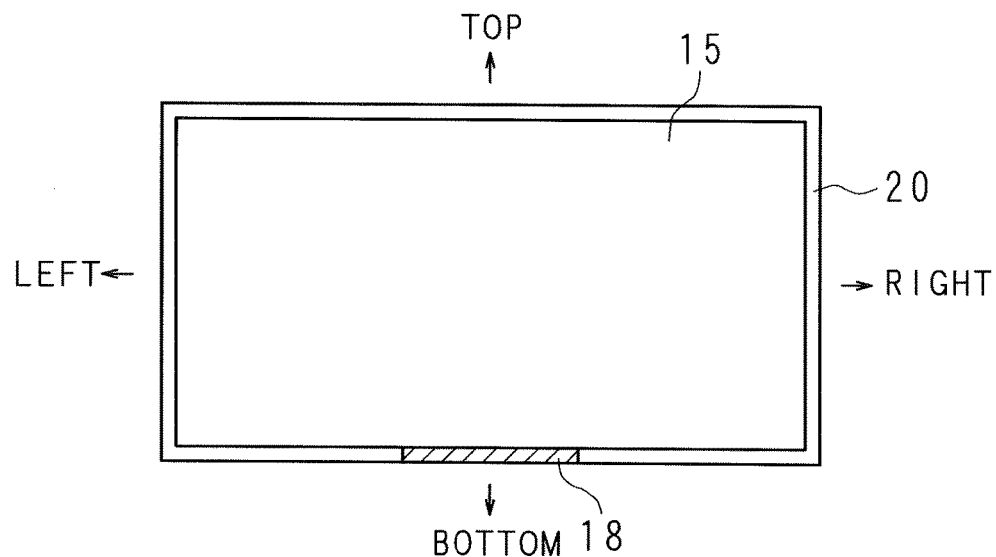
FIG. 3B is a view describing the example of non-limiting attaching position of the adhesive member.
Figure 3C:
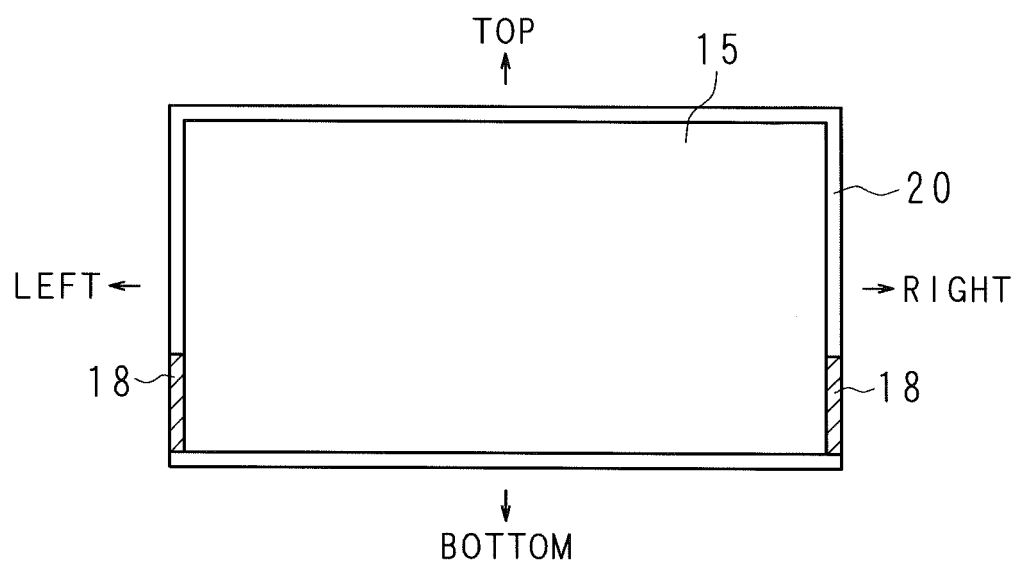
FIG. 3C is a view describing the example of non-limiting attaching position of the adhesive member.

Therefore, by providing the adhesive member 18 under the panel chassis 20, the lower portion of the optical sheet 30 is fixed to the panel chassis 20, and thereby the movement of the optical sheets 30 may be effectively prevented. For example, as illustrated in FIG. 3A, the adhesive member 18 is provided on the entire lower portion of the rectangular frame-shaped panel chassis 20, or as illustrated in FIG. 3B, the adhesive member 18 is provided on a portion (for example a central portion) of the lower portion of the panel chassis 20. In addition, as illustrated in FIG. 3C, the adhesive members 18 may be provided on the lower portions of the left and right side portions of the panel chassis 20.

Figure 4A:
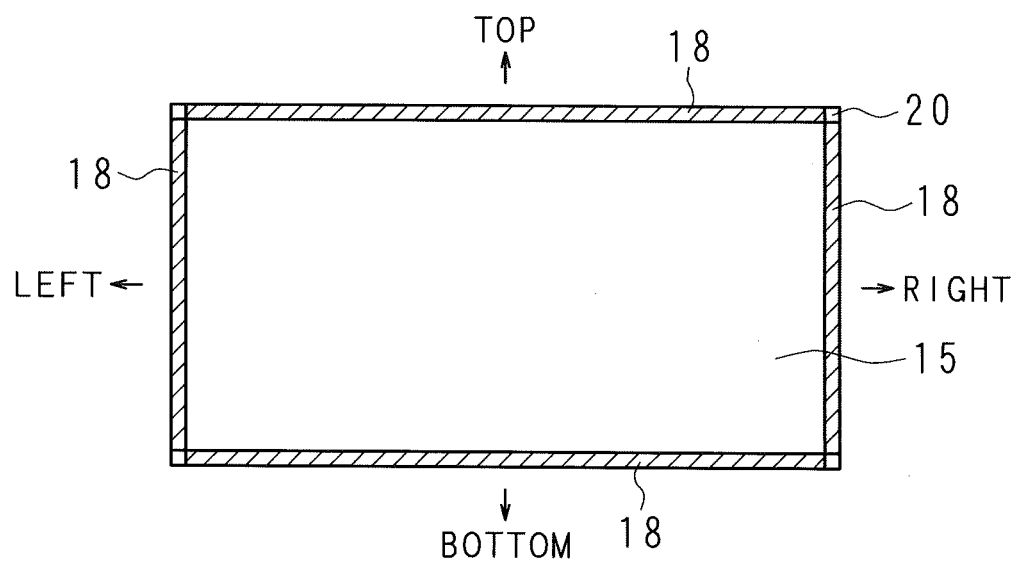
FIG. 4A is a view describing the example of non-limiting attaching position of the adhesive member.
Figure 4B:
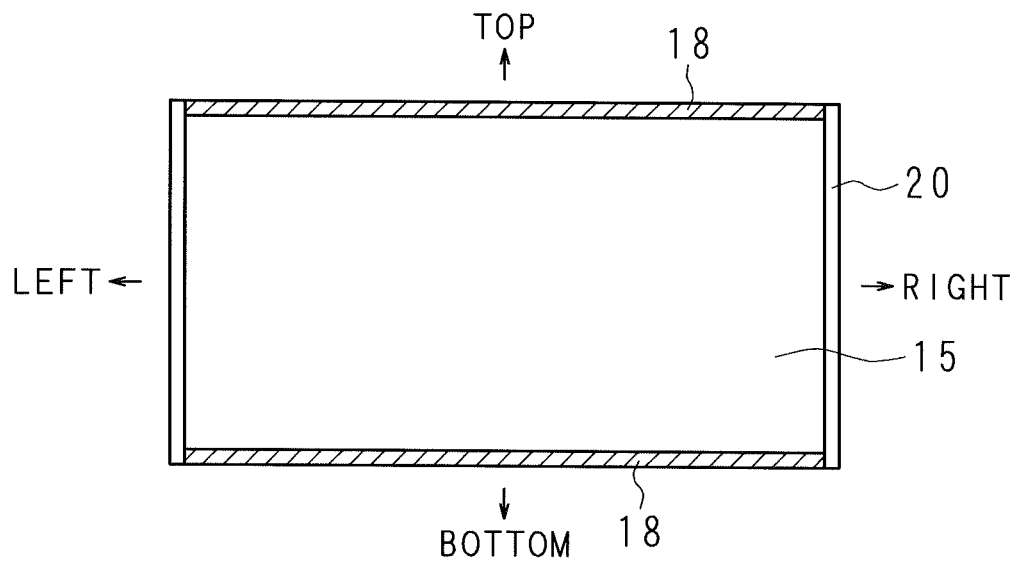
FIG. 4B is a view describing the example of non-limiting attaching position of the adhesive member.

When the upper edge part of the optical sheet 30 is not supported by the backlight chassis 11 or the panel chassis 20 (when the optical sheet 30 is not hung), in order to more reliably prevent the movement of the optical sheets 30, as illustrated in FIG. 4A, the adhesive member 18 may be provided on the entire panel chassis 20. Alternately, in order to suppress an occurrence of the wrinkles in the optical sheets 30 due to the expansion or contraction of the optical sheets 30 by heating or cooling, as illustrated in FIG. 4B, the adhesive member 18 may be provided on two long edge portions of the panel chassis 20 which are positioned opposite to each other.

(Embodiment 2)

Figure 5:
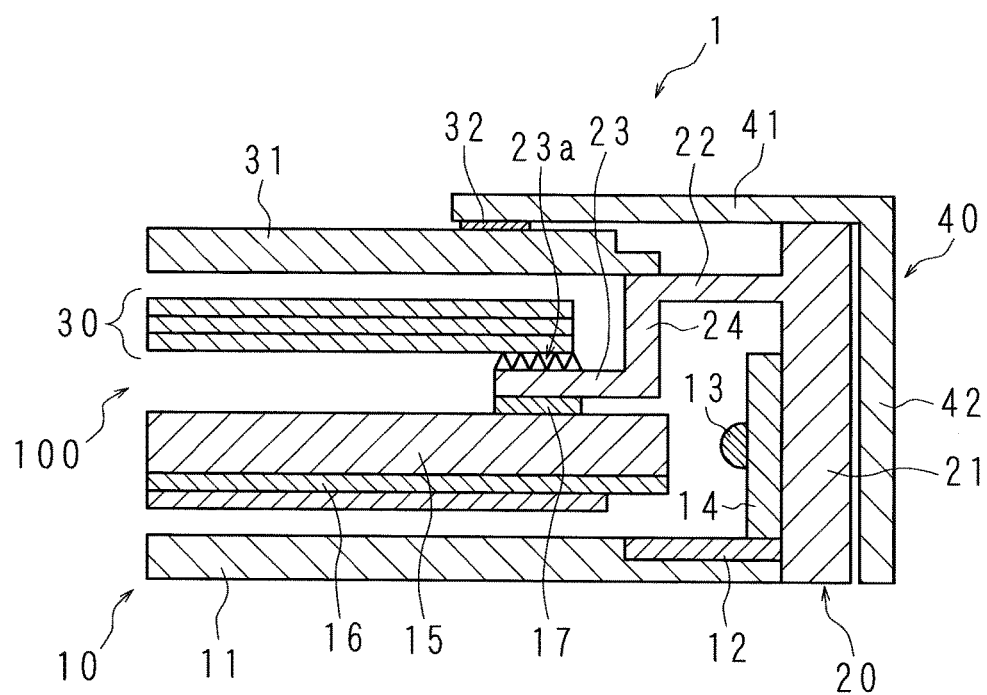
FIG. 5 is a partial cross-sectional view of an example of non-limiting display apparatus according to Embodiment 2.

Hereinafter, the example embodiment will be described with reference to the drawings illustrating a display apparatus 1 according to Embodiment 2. FIG. 5 is a partial cross-sectional view of the example of non-limiting display apparatus 1. In Embodiment 2, the adhesive member 18 is not provided between the sheet support plate 23 of the panel chassis 20 and the optical sheet 30. The sheet support plate 23 is provided with a plurality of convexes and concaves 23a (for example a plurality of grooves) on the front surface thereof. The back edge portion of the optical sheet 30 abuts against the plurality of convexes and concaves 23a. By the plurality of convexes and concaves 23a, frictional resistance of the sheet support plate 23 becomes large, and the movement of the optical sheets 30 is prevented.

The shape of the convexes and concaves 23a formed on the front surface of the sheet support plate 23 may be another shape as long as it can increase the frictional resistance with the optical sheet, without limitation thereof. For example, the convexes and concaves 23a may be formed in a mesh shape by performing knurling on the front surface of the sheet support plate 23.

Alternately, an elastic member may be provided between the front edge portion of the optical sheet 30 and the back edge portion of the display panel 31 as a spacer. By providing the spacer therebetween, the edge portion of the optical sheet 30 is in close contact on the convexes and concaves 23a, such that a larger frictional force may be obtained than without the spacer.

The same parts of the configuration according to Embodiment 2 as those in Embodiment 1 will be denoted by the same reference numerals, and will not be described in detail.

(Embodiment 3)

Figure 6:
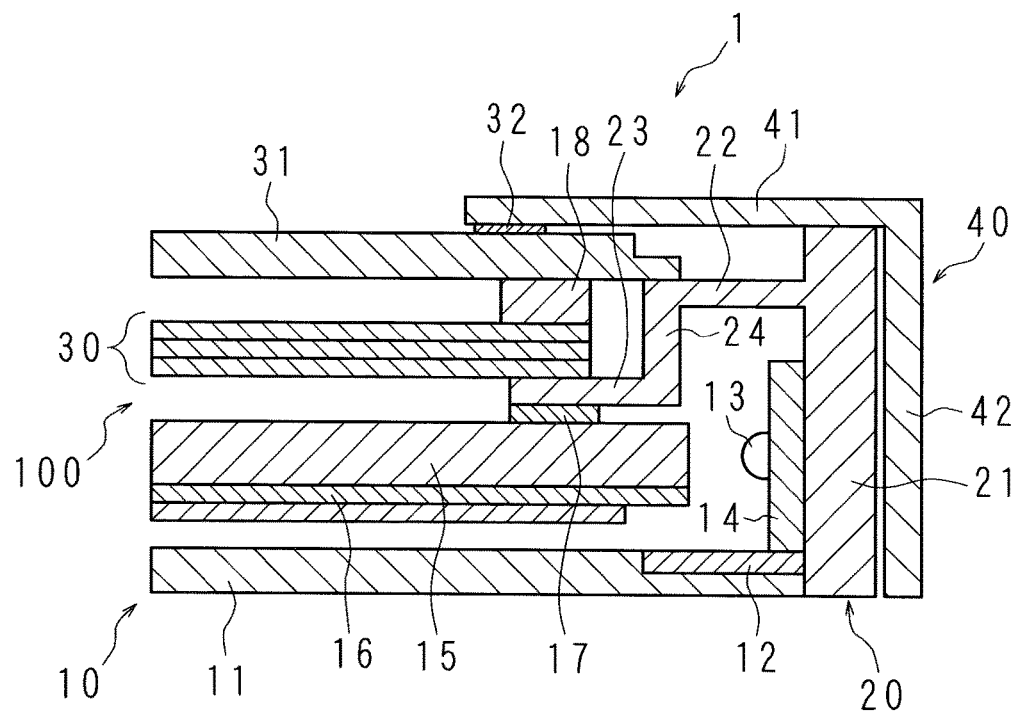
FIG. 6 is a partial cross-sectional view of an example of non-limiting display apparatus according to Embodiment 3.

Hereinafter, the example embodiment will be described with reference to the drawings illustrating a display apparatus 1 according to Embodiment 3. FIG. 6 is a partial cross-sectional view of the example of non-limiting display apparatus 1.

In Embodiment 3, the adhesive member 18 is provided between the display panel 31 and the optical sheet 30. The back edge portion of the display panel 31 and the front edge portion of the optical sheets 30 are adhered to both sides of the adhesive member 18, so as to prevent the movement of the optical sheets 30.

In FIG. 6, although the adhesive member 18 is not illustrated between the optical sheets 30 and the sheet support plate 23, the adhesive member 18 may be provided between the optical sheets 30 and the sheet support plate 23. By providing the adhesive members 18 on both of the front and back edge portions of the optical sheets 30, it is possible to further increase a force holding the optical sheets 30.

The same parts of the configuration according to Embodiment 3 as those in Embodiment 1 or 2 will be denoted by the same reference numerals, and will not be described in detail.

(Embodiment 4)

Figure 7:
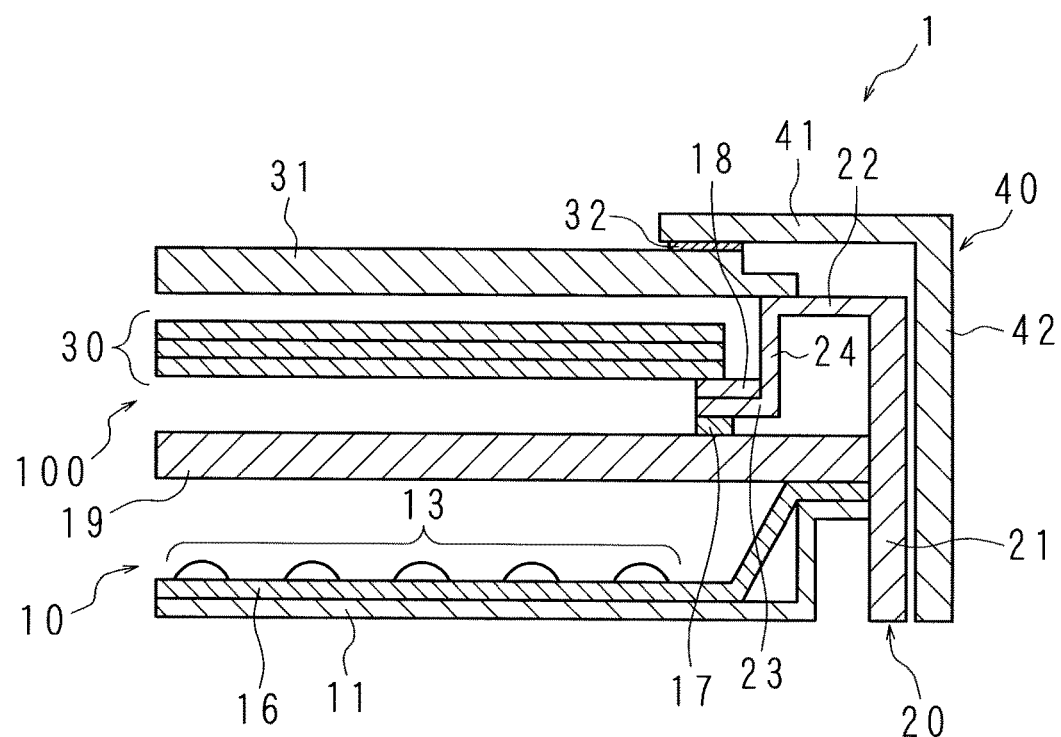
FIG. 7 is a partial cross-sectional view of an example of non-limiting display apparatus according to Embodiment 4.

Hereinafter, the example embodiment will be described with reference to the drawings illustrating a display apparatus 1 according to Embodiment 4. FIG. 7 is a partial cross-sectional view of the example of non-limiting display apparatus 1.

The display apparatus 1 includes a rectangular shallow dish-shaped backlight chassis 11, and a plurality of light emitting diodes 13 provided on the front surface of the backlight chassis 11. The front surface of the backlight chassis 11 is covered by a reflection sheet 16 formed in a shape matching the backlight chassis 11. The reflection sheet 16 is provided with through holes (not illustrated) at positions corresponding to the light emitting diodes 13. The light emitting diodes 13 are located in the through holes.

An edge portion of the backlight chassis 11 protrudes to the front side. A diffusion plate 19 (emitting plate) for diffusing and emitting light toward the front is placed on the edge portion of the backlight chassis 11 through the reflection sheet 16. A gap is present between the diffusion plate 19 and the light emitting diodes 13, and the diffusion plate 19 is disposed opposite to the light emitting diodes 13. An elastic member 17 is provided between the front edge portion of the diffusion plate 19 and the back edge portion of the sheet support plate 23 as a spacer.

The adhesive member 18 is provided between the front edge portion of the sheet support plate 23 and the back edge portion of the optical sheets 30, so as to prevent the movement of the optical sheets 30. A gap is present between the optical sheet 30 and the diffusion plate 19, and the optical sheet 30 is disposed opposite to the diffusion plate 19. Also, in the direct type display apparatus 1, since the movement of the optical sheets 30 is prevented by the adhesive member 18, it is possible to prevent the diffusion plate 19 from being damaged.

The same parts of the configuration according to Embodiment 4 as those in Embodiment 1 to 3 will be denoted by the same reference numerals, and will not be described in detail. In addition, a planar light emitting part 10 of Embodiment 4 includes the light emitting diodes 13, the reflection sheet 16 and the diffusion plate 19.

(Embodiment 5)

Figure 8:
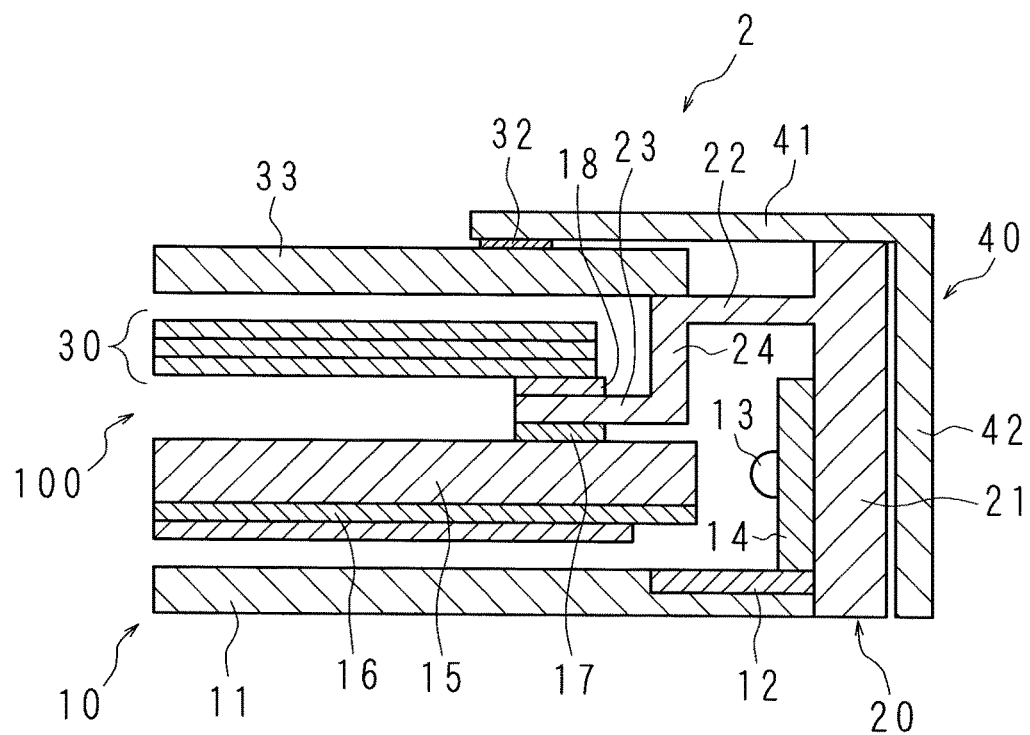
FIG. 8 is a partial cross-sectional view of an example of non-limiting lighting apparatus according to Embodiment 5.

Hereinafter, the example embodiment will be described with reference to the drawings illustrating a lighting apparatus 2 according to Embodiment 5. FIG. 8 is a partial cross-sectional view of the example of non-limiting lighting apparatus 2.

In the lighting apparatus 2, a transmissive panel 33 having light transmittance is disposed on the front side of the optical sheets 30. The transmissive panel 33 is made of, for example, a transparent synthetic resin member. The optical sheets 30 are disposed opposite to the back side of the transmissive panel 33 at a gap. The back edge part of the optical sheet 30 is adhered to the adhesive member 18 provided on the sheet support plate 23. The movement of the optical sheets 30 is prevented by the adhesive member 18.

In addition, the lighting apparatus 2 may be used for advertising by attaching an identification mark such as graphics, characters, or the like on the transmissive panel 33. Further, the planar light emitting part 10 of the lighting apparatus 2 may be configured as the direct type similar to the display apparatus 1 according to Embodiment 4.

The same parts of the configuration according to Embodiment 5 as those in Embodiment 1 to 4 will be denoted by the same reference numerals, and will not be described in detail.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A display apparatus, the display apparatus comprising:
a display panel displaying an image;
a light emitting plate that emits light toward the display panel;
an optical sheet that is separated from and faces a front surface of the light emitting plate between the display panel and the light emitting plate;
a support part which includes a panel support member supporting a back edge portion of the display panel and a sheet support member facing a front edge portion of the light emitting plate and supporting a back edge portion of the optical sheet; and
a holding section that is disposed on the back of the display panel or on the front of the light emitting plate and that faces an edge portion of a front side or a back side of the optical sheet and holds the optical sheet, wherein the holding section adheres to the optical sheet,
wherein an area of the display panel that is supported by the panel support member and an area of the optical sheet that is supported by the sheet support member do not overlap in a front-back direction and the support part further comprises a connecting part that connects an end portion of the panel support member closer to the display panel and an end portion of the sheet support member far from the optical sheet.

2. The display apparatus according to claim 1, further comprising a spacer that is provided between the light emitting plate and a back edge portion of the sheet support member.

3. The display apparatus according to claim 1, further comprising a light emitting diode, wherein light emitted from the light emitting diode enters into the light emitting plate and emits from the light guide plate.

4. The display apparatus according to claim 1, wherein the holding section includes a thermoplastic elastomer member or a double-sided tape.

5. The display apparatus according to claim 1, wherein the holding section includes a convex shape and a concave shape that are formed on a place of the sheet support member facing the edge portion of the optical sheet.

6. The light source unit according to claim 1, wherein the optical sheet is formed in a laterally long rectangular shape, and the holding section is provided on the long edge part of the optical sheet.

7. A lighting apparatus, the lighting apparatus comprising:
a transmissive panel having light transmittance;

a light emitting plate that emits light toward the transmissive panel;

an optical sheet that is separated from and faces a front surface of the light emitting plate between the transmissive panel and the light emitting plate;

a support part which includes a panel support member supporting a back edge portion of the transmissive panel and a sheet support member facing a front edge portion of the light emitting plate and supporting a back edge portion of the optical sheet; and a holding section that is disposed on the back of the transmissive panel or on the front of the light emitting plate and that faces an edge portion of a front side or a back side of the optical sheet and holds the optical sheet, wherein the holding section adheres to the optical sheet, wherein an area of the transmissive panel that is supported by the panel support member and an area of the optical sheet that is supported by the sheet support member do not overlap in a front-back direction and the support part further comprises a connecting part that connects an end portion of the panel support member closer to the transmissive panel and an end portion of the sheet support member far from the optical sheet.

8. The lighting apparatus according to claim 7, further comprising a light emitting diode, wherein light emitted from the light emitting diode enters into the light emitting plate and emits from the light guide plate.

9. The lighting apparatus according to claim 8, wherein the light emitting diode is disposed opposite to a peripheral surface of the light emitting plate.

10. The lighting apparatus according to claim 8, wherein the light emitting diode is disposed opposite on a surface of a back light chassis opposite to the light emitting plate.

11. The lighting apparatus according to claim 7, further comprising a spacer that is provided between the light emitting plate and a back edge portion of the sheet support member.

12. The lighting apparatus according to claim 7, wherein the holding section includes a thermoplastic elastomer member or a double-sided tape.

13. The lighting apparatus according to claim 7, wherein the holding section includes a convex shape and a concave shape that are formed on a place of the sheet support member facing the edge portion of the optical sheet.

14. The lighting apparatus according to claim 7, wherein the optical sheet is formed in a laterally long rectangular shape, and the holding section is provided on the long edge part of the optical sheet.

* * * * *